United States Patent
Tsai

(10) Patent No.: US 11,381,300 B2
(45) Date of Patent: Jul. 5, 2022

(54) METHOD AND APPARATUS FOR PERFORMING RANDOM ACCESS PROCEDURE FOR BEAM FAILURE RECOVERY

(71) Applicant: FG Innovation Company Limited, Tuen Mun (HK)

(72) Inventor: Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/073,995

(22) Filed: Oct. 19, 2020

(65) Prior Publication Data

US 2021/0126698 A1 Apr. 29, 2021

Related U.S. Application Data

(60) Provisional application No. 62/926,389, filed on Oct. 25, 2019.

(51) Int. Cl.
| | |
|---|---|
| *H04B 7/08* | (2006.01) |
| *H04B 17/318* | (2015.01) |
| *H04W 74/02* | (2009.01) |
| *H04W 74/08* | (2009.01) |

(52) U.S. Cl.
CPC .......... *H04B 7/088* (2013.01); *H04B 17/318* (2015.01); *H04W 74/02* (2013.01); *H04W 74/0833* (2013.01)

(58) Field of Classification Search
CPC .... H04B 7/088; H04B 17/318; H04B 7/0695; H04W 74/02; H04W 74/0833
See application file for complete search history.

(56) References Cited

U.S. PATENT DOCUMENTS

| | | | |
|---|---|---|---|
| 10,863,570 B2* | 12/2020 | Cirik | H04B 7/088 |
| 2018/0110074 A1* | 4/2018 | Akkarakaran | H04W 74/0833 |
| 2020/0092777 A1* | 3/2020 | Agiwal | H04W 80/02 |
| 2020/0107369 A1* | 4/2020 | Jeon | H04W 74/0833 |
| 2020/0145089 A1* | 5/2020 | Wei | H04W 76/19 |
| 2020/0221506 A1* | 7/2020 | Jeon | H04W 74/0833 |
| 2020/0314913 A1* | 10/2020 | Rastegardoost | H04W 74/0833 |
| 2020/0383167 A1* | 12/2020 | Sengupta | H04W 72/0413 |
| 2020/0413450 A1* | 12/2020 | Kim | H04W 36/08 |
| 2021/0100034 A1* | 4/2021 | Turtinen | H04B 17/318 |
| 2021/0105828 A1* | 4/2021 | Agiwal | H04B 17/327 |
| 2021/0120581 A1* | 4/2021 | Kim | H04L 1/0025 |
| 2021/0307060 A1* | 9/2021 | Agiwal | H04B 7/0695 |

* cited by examiner

*Primary Examiner* — Ivan O Latorre
(74) *Attorney, Agent, or Firm* — ScienBiziP, P.C.

(57) ABSTRACT

A method performed by a User Equipment (UE) for Beam Failure Recovery (BFR) is provided. The method includes the UE detecting a beam failure event on a serving cell, and initiating a Random Access (RA) procedure for BFR on a Bandwidth Part (BWP) of the serving cell. The RA procedure for BFR includes performing an RA type selection after determining that the UE is not configured with any Contention-Free RA (CFRA) resource for BFR, the RA type selection including determining a 2-step RA type or a 4-step RA type as an RA type of the RA procedure for BFR based on a Reference Signal Received Power (RSRP) value of a Downlink (DL) pathloss reference, skipping performing the RA type selection after determining that the UE is configured with a CFRA resource for BFR, and determining the RA type as the 4-step RA type after skipping the RA type selection.

14 Claims, 14 Drawing Sheets

METHOD AND APPARATUS FOR PERFORMING RANDOM ACCESS PROCEDURE FOR BEAM FAILURE RECOVERY

CROSS-REFERENCE TO RELATED APPLICATION(S)

The present disclosure claims the benefit of and priority to provisional U.S. Patent Application Ser. No. 62/926,389 ("the '389 provisional"), filed on Oct. 25, 2019, entitled "Method and apparatus for two step random access procedure for beam failure recovery." The content(s) of the '389 provisional are fully incorporated herein by reference for all purposes.

FIELD

The present disclosure generally relates to wireless communications, and more specifically, to methods and apparatuses for performing a Random Access (RA) procedure for Beam Failure Recovery (BFR).

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for performing an RA procedure for BFR.

According to an aspect of the present disclosure, a method performed by a User Equipment (UE) for BFR is provided. The method includes the UE detecting a beam failure event on a serving cell, and initiating an RA procedure for BFR on a Bandwidth Part (BWP) of the serving cell. The RA procedure for BFR includes performing an RA type selection after determining that the UE is not configured with any Contention-Free RA (CFRA) resource for BFR, the RA type selection including determining one of a 2-step RA type and a 4-step RA type as an RA type of the RA procedure for BFR based on a Reference Signal Received Power (RSRP) value of a Downlink (DL) pathloss reference, skipping performing the RA type selection after determining that the UE is configured with a CFRA resource for BFR, and determining the RA type as the 4-step RA type after skipping performing the RA type selection.

According to another aspect of the present disclosure, a UE for BFR is provided. The UE includes a memory and at least one processor coupled to the memory. The at least one processor is configured to detect a beam failure event on a serving cell, and initiate an RA procedure for BFR on a BWP of the serving cell. The RA procedure for BFR includes performing an RA type selection after determining that the UE is not configured with any CFRA resource for BFR, the RA type selection including determining one of a 2-step RA type and a 4-step RA type as an RA type of the RA procedure for BFR based on an RSRP value of a DL pathloss reference, skipping performing the RA type selection after determining that the UE is configured with a CFRA resource for BFR, and determining the RA type as the 4-step RA type after skipping performing the RA type selection.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
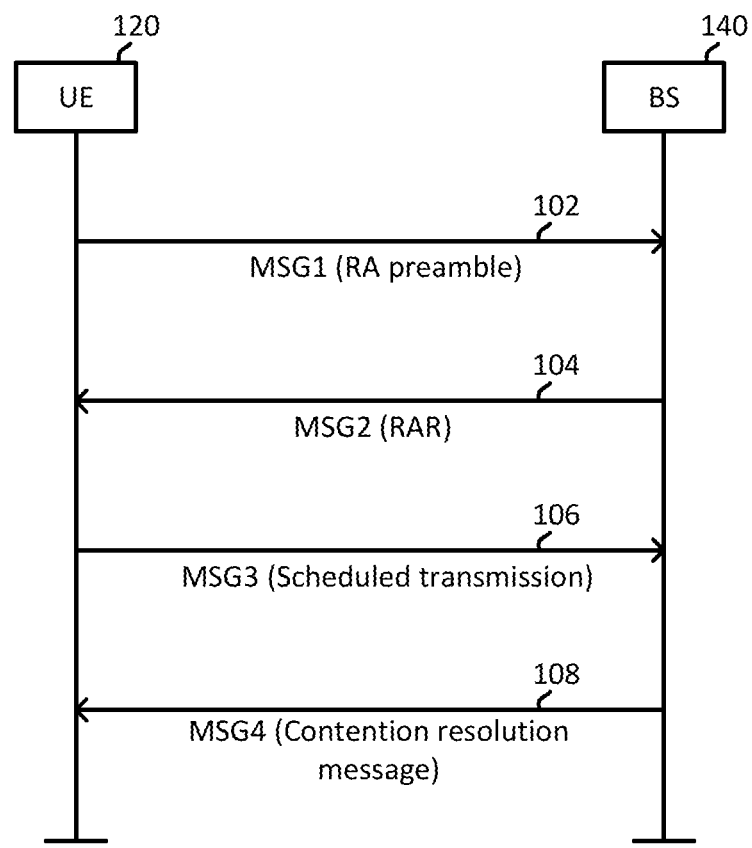
FIG. 1 illustrates a sequence diagram of a Contention-Based Random Access (CBRA) with a 4-step RA type, in accordance with an implementation of the present disclosure.

The terms mentioned in the present disclosure are defined as follows. Unless otherwise specified, the terms in the present disclosure have the following meanings.

Abbreviation Full Name

3GPP 3rd Generation Partnership Project
5G 5th generation

BF Beam Failure
BFD Beam Failure Detection
BFI Beam Failure Instance
BFR Beam Failure Recovery
BS Base Station
BWP Band Width Part
CA Carrier Aggregation
CC Component Carriers
CCCH Common Control Channel
CBRA Contention-Based Random Access
CE Control Element
CFRA Contention-Free Random Access
CG Cell Group
C-RNTI Cell-Radio Network Temporary Identifier
CSI Channel State Information
CSI-RS Channel State Information based Reference Signal
CSI-RSRP Channel State Information-Reference Signal Received Power
CQI Channel Quality Indicator
DCI Downlink Control Information
DL Downlink
L1 Layer 1
L2 Layer 2
LTE Long Term Evolution
MAC Medium Access Control
MIMO Multi-input Multi-output
MSG0 Message 0
MSG1 Message 1
MSG2 Message 2
MSG3 Message 3
MSG4 Message 4
MSGA Message A
MSGB Message B
NR New RAT/Radio
NUL Normal Uplink
NW Network
PCell Primary Cell
PDCCH Physical Downlink Control Channel
PDSCH Physical Downlink Shared Channel
PDU Protocol Data Unit
PHY Layer Physical Layer
PRACH Physical Random Access Channel
PSCell Primary SCell
PUCCH Physical Uplink Control Channel
PUSCH Physical Uplink Shared Channel
QoS Quality of Service
RA Random Access
RACH Random Access Channel
RAR Random Access Response
RA-RNTI Random Access-Radio Network Temporary Identifier
RLC Radio Link Control
RNTI Radio Network Temporary Identifier
RRC Radio Resource Control
RS Reference Signal
RSRP Reference Signal Received Power
SCell Secondary Cell
SDAP Service Data Adaptation Protocol
SDU Service Data Unit
SINR Signal to Interference plus Noise Ratio
SR Scheduling Request
SRS Sounding Reference Signal
SSB Synchronization Signal Block
SS-RSRP Synchronization Signal-Reference Signal Received Power
SUL Supplementary Uplink
SpCell Special Cell
TA Timing Advance
TCI Transmission Configuration Indication
TC-RNTI Temporary C-RNTI
TR Technical Report
TRP Transmission/Reception Point
TS Technical Specification
UE User Equipment
UL Uplink
UL-SCH Uplink Shared Channel The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network (NW)" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any NW function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed NW function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long-Term Evolution (LTE) system, an LTE-Advanced (LTE-A) system, or an LTE-Advanced Pro system) may typically include at least one Base Station (BS), at least one UE, and one or more optional NW elements that provide connection towards an NW. The UE may communicate with the NW (e.g., a Core Network (CN), an Evolved Packet Core (EPC) NW, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the SGC, a next-generation Node B (gNB) as in the 5G Access Network (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the NW dynamics of NR. Besides, an SL resource may also be provided in an NR frame to support ProSe services.

In NR, some types of RA procedures may be supported:
CBRA with 4-step RA type (e.g., referred to 4-step CBRA in the present application)

CBRA with 2-step RA type (e.g., referred to 2-step CBRA in the present application)

CFRA with 4-step RA type (e.g., referred to 4-step CFRA in the present application)

CFRA with 2-step RA type (e.g., referred to 2-step CFRA in the present application)

FIG. 1 illustrates a sequence diagram of a CBRA with 4-step RA type, according to an implementation of the present disclosure.

As illustrated in FIG. 1, in action 102, the UE 120 may transmit an MSG1 (e.g., including an RA preamble) to the BS 140.

In action 104, the UE 120 may receive an MSG2 (e.g., including an RAR) from the BS 140.

In action 106, the UE 120 may transmit an MSG3 (e.g., including a scheduled transmission) to the BS 140.

In action 108, the UE 120 may receive an MSG4 (e.g., including contention resolution message) from the BS 140.

Figure 2:
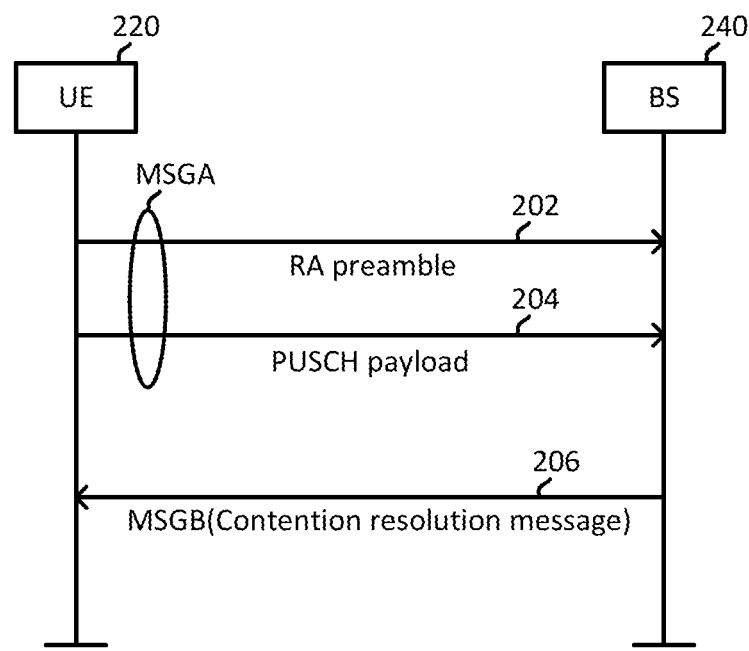
FIG. 2 illustrates a sequence diagram of a CBRA with 2-step RA type in accordance with an implementation of the present disclosure.

FIG. 2 illustrates a sequence diagram of a CBRA with 2-step RA type, according to an implementation of the present disclosure. In the 2-step CBRA procedure, the messages may be identified as MSG A (MSGA) and MSG B (MSGB).

In actions 202 and 204, the UE 220 may transmit the MSGA (including an RA preamble and a PUSCH payload) to the BS 240.

In action 206, the UE 220 may receive the MSGB (e.g., including a contention resolution message) from the BS 240.

Figure 3A:
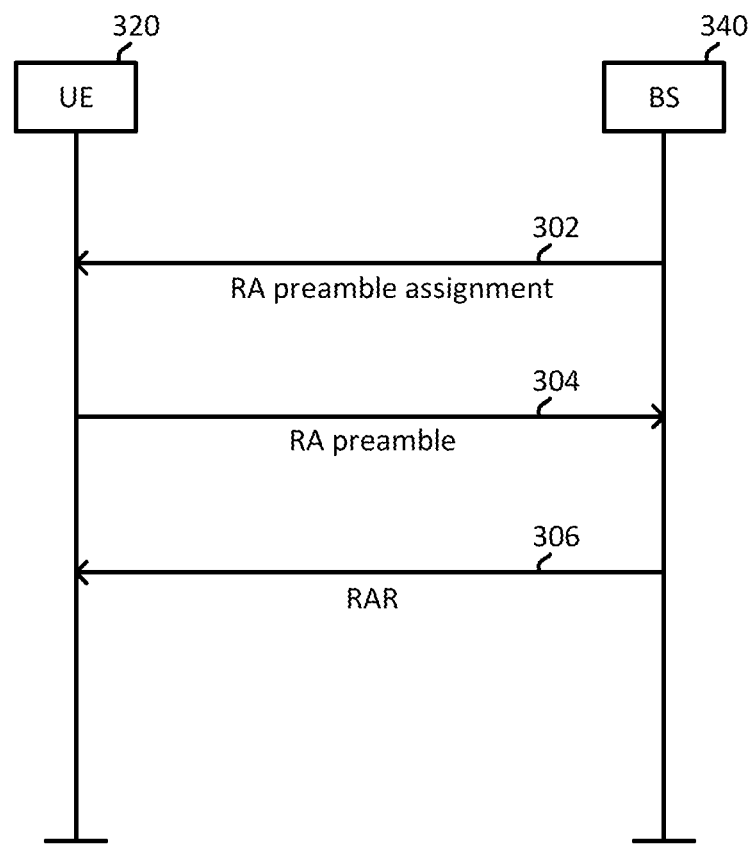
FIG. 3A illustrates a sequence diagram of a CFRA with 4-step RA type, in accordance with an implementation of the present disclosure.

FIG. 3A illustrates a sequence diagram of a CFRA with 4-step RA type, according to an implementation of the present disclosure.

As illustrated in FIG. 3A, in action 302, the UE 320 may receive an RA preamble assignment from the BS 340.

In action 304, the UE 320 may transmit an RA preamble to the BS 340 based on the RA preamble assignment.

In action 306, the UE 320 may receive an RAR from the BS 340.

Figure 3B:
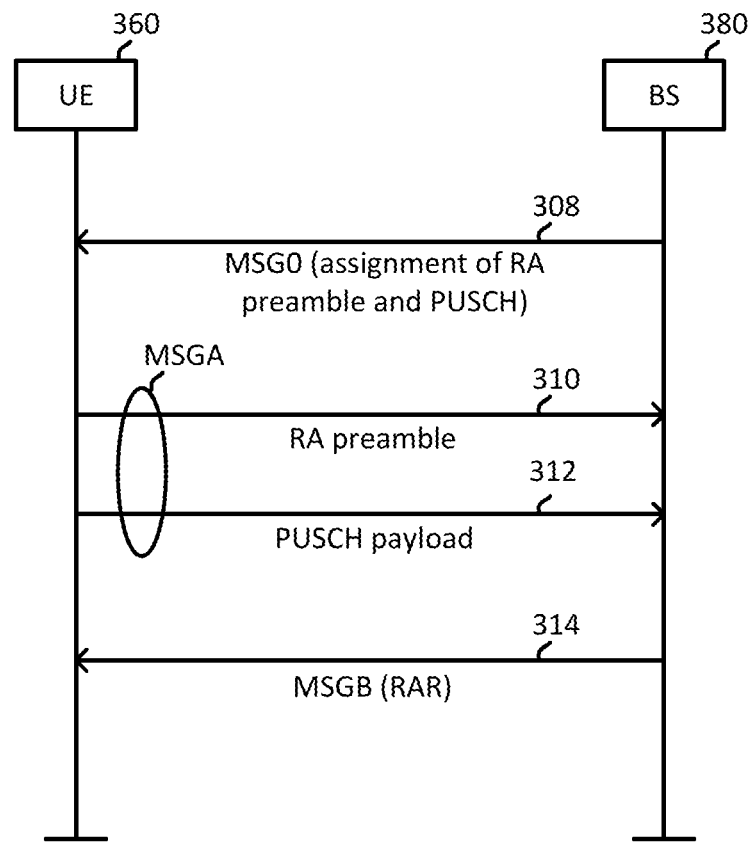
FIG. 3B illustrates a sequence diagram of a CFRA with 2-step RA type, in accordance with an implementation of the present disclosure.

FIG. 3B illustrates a sequence diagram of a CFRA with 2-step RA type, according to an implementation of the present disclosure. As illustrated in FIG. 3B, in action 308, the UE 360 may receive an MSG0 (e.g., including an assignment of both RA preamble and PUSCH) from the BS 380.

In actions 310 and 312, the UE 360 may transmit an MSGA (e.g., including an RA preamble and a PUSCH payload) to the BS 380 based on the assignment received in action 308.

In action 314, the UE 360 may receive an MSGB (e.g., including an RAR) from the BS 380.

Figure 4:
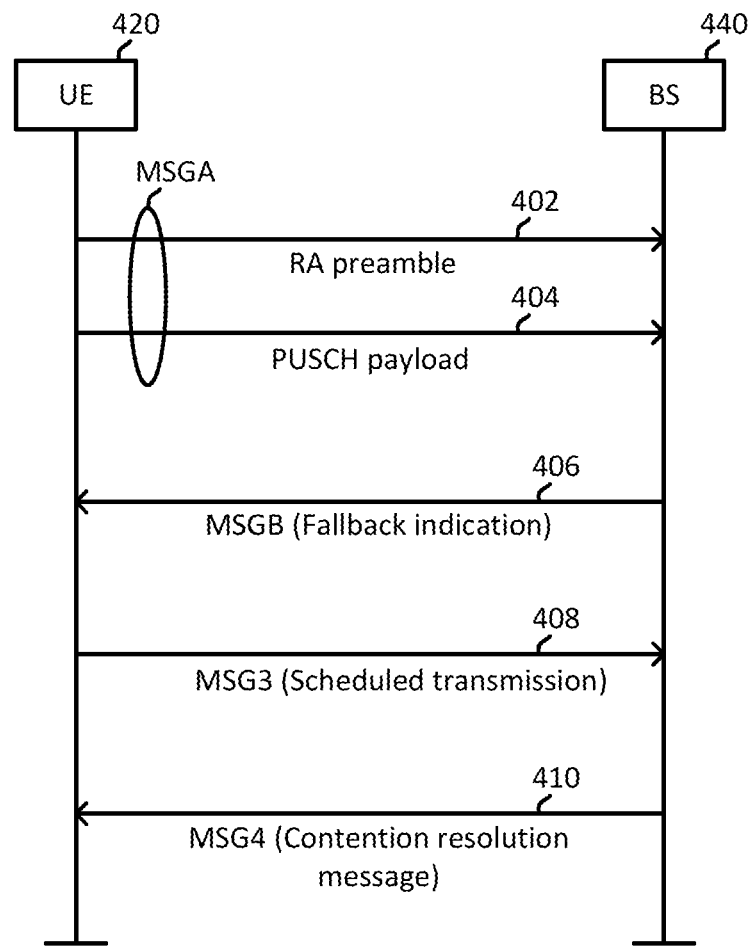
FIG. 4 is a sequence diagram of a fallback from a 2-step RA procedure to a 4-step RA procedure, in accordance with an implementation of the present disclosure.

FIG. 4 is a sequence diagram of a fallback from a 2-step RA procedure to a 4-step RA procedure, according to an implementation of the present disclosure.

As illustrated in FIG. 4, in actions 402 and 404, the UE 420 may transmit the MSGA (including an RA preamble and a PUSCH payload) of the 2-step RA procedure to the BS 440.

In action 406, the UE 420 may receive a fallback indication (which is considered as (or as part of) the MSGB) from the BS 440.

In response to the fallback indication, the UE 420 may switch to the 4-step RA procedure. As illustrated in FIG. 4, the UE 420 may perform MSG3 transmission and MSG4 (e.g., including contention resolution message) reception in actions 408 and 410, respectively. A UE may select the type of RA based on the NW configuration. An RSRP threshold may be used by the UE to select the RA type as a 2-step RA type or a 4-step RA type at the initiation of an RA procedure.

The MSG1 of the 4-step RA type consists of a preamble on PRACH. After MSG1 transmission, the UE may monitor a response from the NW (e.g., a BS) within a configured window. For CFRA, the dedicated preamble for MSG1 transmission may be assigned by the NW, and upon receiving an RAR from the NW, the UE may end the RA procedure. For CBRA, upon reception of the RAR, the UE may send an MSG3 using the UL grant scheduled in the response and monitor a contention resolution message from the NW. If the UE does not successfully receive the contention resolution message after the MSG3 (re)transmission (s), the UE may go back to perform the MSG1 transmission.

The MSGA of the 2-step RA type includes a preamble on PRACH and a payload on PUSCH. After the MSGA transmission, the UE may monitor for a response (e.g., MSGB) from the NW (e.g., the BS) within a configured window. For CBRA, if the UE successfully receives an MSGB including a contention resolution message after the UE receives the NW response, the UE may end the RA procedure, as illustrated in FIG. 2. On the other hand, if a fallback indication is received in the MSGB, the UE may perform MSG3 transmission using the UL grant provided in the fallback indication and monitor a contention resolution message from the BS, as illustrated in FIG. 4. If the UE does not successfully receive the contention resolution message from the NW/BS after the MSG3 (re)transmission(s), the UE may perform MSGA transmission again.

If the RA procedure with a 2-step RA type is not completed after a number of MSGA transmissions, the UE may switch to perform a CBRA with a 4-step RA type. More specifically, whether the UE could switch to perform a CBRA with a 4-step RA type may be configured by the NW (e.g., via an RRC configuration).

In one implementation, for RA in a cell configured with SUL, the NW can explicitly signal which carrier to use (UL or SUL). Otherwise, the UE may select the SUL carrier if (and only if) the measured quality of the DL is lower than a threshold broadcast by the NW.

In addition, an RA procedure may be triggered by at least one of the following events:

Initial access from RRC_IDLE;

RRC Connection Re-establishment procedure;

DL or UL data arrival during RRC_CONNECTED when UL synchronization status is "non-synchronized";

UL data arrival during RRC_CONNECTED when there are no PUCCH resources for SR available;

SR failure;

Request by RRC upon synchronous reconfiguration (e.g., handover);

Transition from RRC INACTIVE;

To establish time alignment for a secondary TAG;

Request for Other SI (system information) (in some situations, an MSG1-based request for other SI may not be supported by the 2-step RA procedure);

BFR

As described above, some messages used in the 4-step RA procedure may be identified as MSG1, MSG2 and MSG3. The non-limiting explanations of these messages are provided as follows.

MSG1: RA preamble of the RA procedure.

MSG2: RAR of the RA procedure. An RAR may include one or more MAC subheaders and/or one or more MAC RARs.

In one implementation, the MAC subheader of the RAR may include the following fields:

E field: The Extension field is a flag indicating if the MAC subPDU including this MAC subheader is the last MAC subPDU or not in the MAC PDU. The E field is set to "1" to indicate at least another MAC subPDU follows. The E field is set to "0" to indicate that the MAC subPDU including this MAC subheader is the last MAC subPDU in the MAC PDU;

R field: Reserved bit, set to "0";

BI field: The Backoff Indicator field identifies the overload condition in the cell. The size of the BI field is 4 bits;

RA Preamble IDentifier (RAPID) field: The RA Preamble IDentifier field identifies the transmitted RA Preamble. The size of the RAPID field may be 6 bits. If the RAPID in the MAC subheader of a MAC subPDU corresponds to one of the RA Preambles configured for SI request, MAC RAR is not included in the MAC subPDU.

In one implementation, the MAC RAR may include the following fields:

R field: Reserved bit, set to "0";

Timing Advance Command: The Timing Advance Command field indicates the index value TA used to control the amount of timing adjustment that the MAC entity has to apply in TS 38.213. The size of the Timing Advance Command field is 12 bits;

UL Grant: The Uplink Grant field indicates the resources to be used on the uplink in TS 38.213. The size of the UL Grant field is 27 bits;

Temporary C-RNTI: The Temporary C-RNTI field indicates the temporary identity that is used by the MAC entity during RA. The size of the Temporary C-RNTI field is 16 bits.

MSG3: a message transmitted in the first scheduled transmission of the RA procedure. The MSG3 transmitted on a UL-SCH containing a C-RNTI MAC CE or a CCCH SDU may be used as part of an RA procedure. The C-RNTI MAC CE or the CCCH SDU may be submitted from the upper layer and associated with the UE Contention Resolution Identity.

MSG4: response to the MSG3 in the 4-step RA procedure. The MSG4 may include a contention resolution message.

MSGA: preamble (e.g., PRACH transmission) and payload transmissions (e.g., PUSCH transmission) of the 2-step RA procedure.

MSGB: response to the MSGA in the 2-step RA procedure. The MSGB may include response(s) for contention resolution, fallback indication(s), and backoff indication.

In one implementation, for a 2-step RACH procedure, one or more than one of the following processes/features may be applied:

UE may retry on 2-step RA for MSGA retransmission (e.g., preamble and PUSCH).

For MsgA with C-RNTI, the UE may monitor the PDCCH addressed to C-RNTI for success response and MSGB-RNTI (e.g., RA-RNTI or new RNTI).

For contention resolution of the 2-step RA procedure.

If the PDU PDCCH addressed to the C-RNTI (e.g., C-RNTI included in MSGA) containing the 12 bit TA command is received, the UE should consider the contention resolution to be successful and stop the reception of MSGB or with UL grant if the UE is synchronized already.

If the corresponding fallback RAR is detected, the UE should stop the monitoring of PDCCH addressed to the corresponding C-RNTI for success response and process the fallback operation accordingly.

If neither corresponding fallback RAR nor PDCCH addressed C-RNTI is detected within the response window, the UE should consider the MSGA attempt failed and do back off operation based on the backoff indicator if received in MSGB.

The NW response to the MSGA (e.g., MSGB/MSG2) may include the following parameters:

SuccessRAR

FallbackRAR

Backoff Indication

The following fields may be included in the successRAR when the CCCH message is included in MSGA:

Contention resolution ID

C-RNTI

TA command

Upon receiving the fallbackRAR, the UE may proceed to the MSG3 transmission of a 4-step RA procedure.

FallbackRAR may contain the following fields:

RAPID

UL grant (to retransmit the MSGA payload)

TC-RNTI

TA command

RA type selection (e.g., to select 2-step RA or 4-step RA) is performed before beam selection.

No need to re-execute RA selection criteria upon fallback failure (e.g., if the reception of MSG3 fails). The UE may perform retransmissions using MSGA.

The NW may configure the number of times "N," a UE may attempt to retransmit the MSGA for "N" times during the RA procedure.

RA type selection is NOT left up to UE implementation.

If the UE is configured with 2-step RA and the RSRP is above a configurable threshold, the UE shall use the 2-step RA procedure.

2-step RA resources may only be configured on SpCell.

The 2-step RA resources may be configured on a BWP where 4-step CBRA resources are not configured. In that case, the UE may not switch the RA type to 4-step RA type.

The PDCCH triggered 2-step CFRA may not be supported.

The 2-step CBRA for SpCell BFR may be supported.

Figure 5:
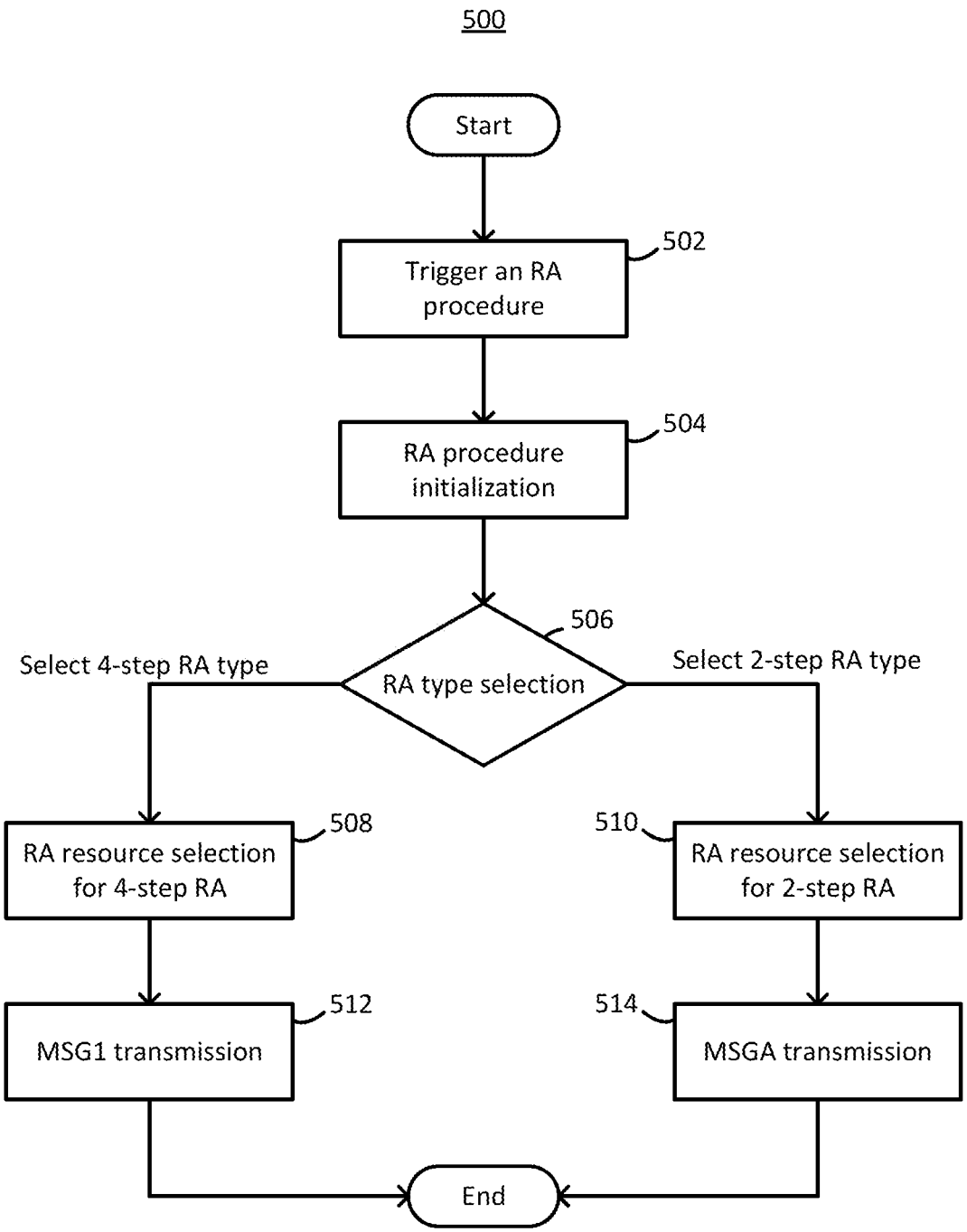
FIG. 5 illustrates a flowchart of an RA procedure in accordance with an implementation of the present disclosure.

FIG. 5 illustrates a flowchart of an RA procedure 500 according to an implementation of the present disclosure. As illustrated in FIG. 5, if a UE triggers an RA procedure (action 502), the UE may enter into the phase of RA procedure initialization (action 504). In the RA procedure initialization, the UE may select an RA type for the RA procedure (action 506). For example, the UE may select a 2-step RA type or a 4-step RA type as the RA type of the RA procedure based on an RSRP value. For example, the UE may select the 2-step RA type if the RSRP value of the DL pathloss reference is larger than (or equal to) a specific threshold (e.g., rsrp-ThresholdSSB-2stepRA). The UE may select the 4-step RA type if the RSRP value of the DL pathloss reference is lower than the rsrp-ThresholdSSB-2stepRA. If the UE selects the 2-step RA type as the RA type of the RA procedure, the UE may perform an RA resource selection for a 2-step RA procedure (action 510). During the RA resource selection for the 2-step RA procedure, the UE may select an SSB, select an RA preamble randomly with equal probability from the 2-step RA preambles associated with the selected SSB, determine the next available PRACH occasion from the PRACH occasions corresponding to the selected SSB, and determine the UL grant for the PUSCH resource of MSGA associated with the selected preamble and PRACH occasion. After the RA resource selection, the UE may perform MSGA transmission(s) based on the selected RA resource (action 514). If the UE selects the 4-step RA as the RA type of the RA procedure, the UE may perform an RA resource selection for a 4-step RA procedure (action 508) (e.g., to select a CFRA or CBRA resource). The 4-step RA procedure may be a 4-step CFRA procedure or a 4-step CBRA procedure. After the RA resource selection, the UE may perform a 4-step CFRA procedure or 4-step CBRA procedure (e.g., based on some criteria specified in 3GPP TS 38.321 V15.6.0), during which the UE may perform MSG1 transmission(s) by using the selected RA resource (action 512).

In one implementation, for a 2-step RA type for BFR, only a 2-step CBRA procedure can be used in BFR, but a 2-step CFRA procedure cannot.

Figure 6:
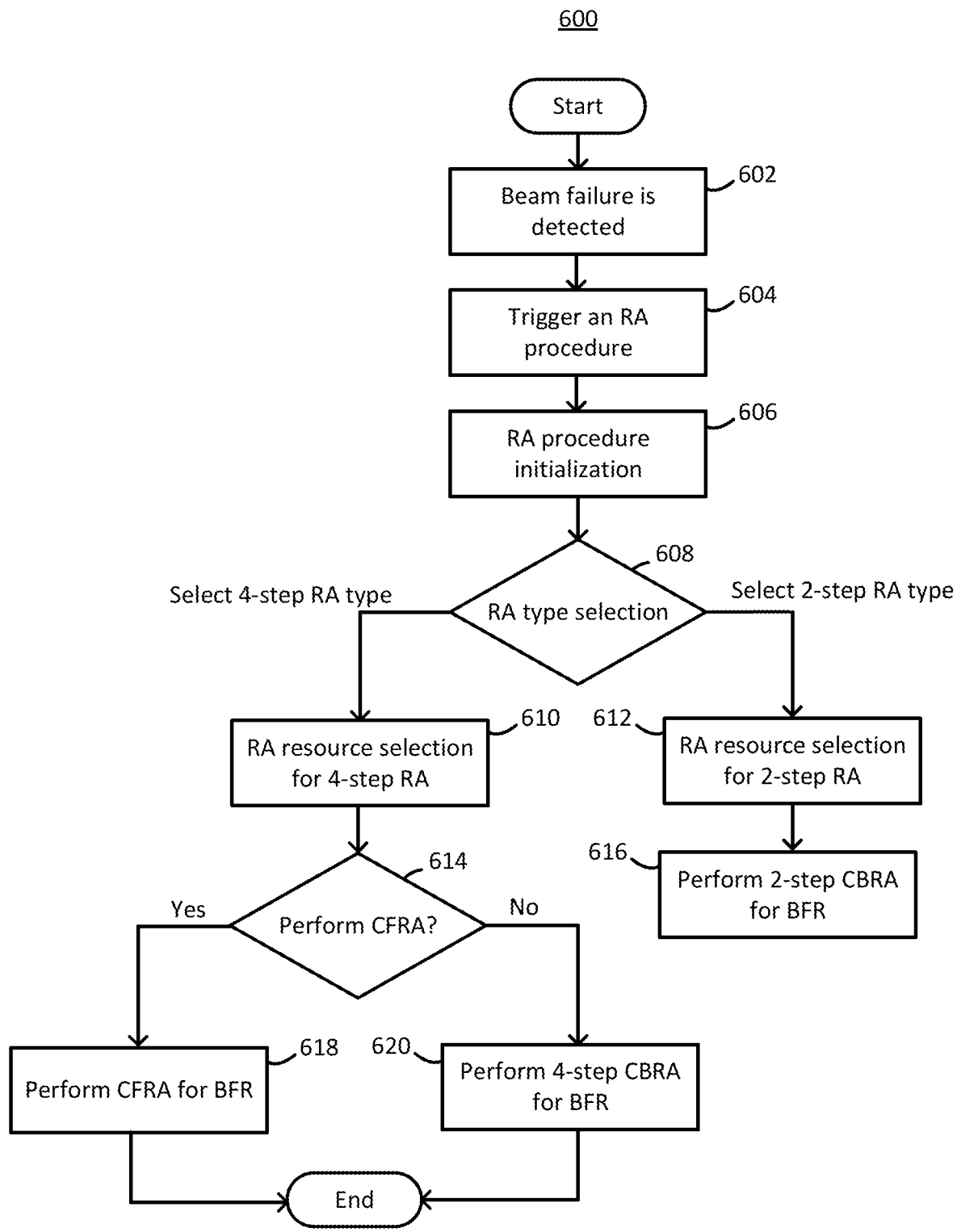
FIG. 6 illustrates a flowchart of an RA procedure for BFR according to an implementation of the present disclosure.

FIG. 6 illustrates a flowchart of an RA procedure 600 for BFR according to an implementation of the present disclosure. As illustrated in FIG. 6, when a UE detects beam failure (event) (e.g., on an SpCell) (action 602), the UE may trigger an RA procedure for BFR (action 604) and enter the phase of RA procedure initialization (action 606). In the RA procedure initialization, the UE may perform an RA type selection to select the 4-step RA or 2-step RA as the RA type of the RA procedure (action 608), and determine whether to perform a CFRA procedure or a CBRA procedure. For example, if the UE selects the 2-step RA as the outcome of action 608, the UE may perform an RA resource selection for a 2-step RA procedure (action 612) and perform a 2-step CBRA procedure by using the selected RA resource (action 616). It is noted that the UE may not be allowed to perform a 2-step CFRA procedure for BFR. Although the UE may have a chance to fall back to perform a 4-step CBRA procedure (e.g., upon receiving fallbackRAR, and/or after "N" times attempts for MSGA retransmissions), the UE may still lose the chance to perform a CFRA procedure for BFR during this RA procedure (since the UE has selected the RA type as 4-step RA for this RA procedure). In the implementation illustrated in FIG. 6, the only way to perform a CFRA procedure for BFR is that the UE selects the 4-step RA as the outcome of action 608.

On the other hand, if the 4-step RA is selected as the RA type of the RA procedure in action 608, the UE may perform an RA resource selection (action 610) to determine whether any candidate beam (e.g., SSB(s) and/or CSI-RS(s) in candidateBeamRSList) is qualified to use. The candidate beam may be associated with a CFRA resource for BFR. In or after the RA resource selection, the UE may determine whether to perform a CFRA procedure for BFR or a 4-CBRA procedure base on certain criteria (action 614). For example, if there is a candidate beam qualified and the beamFailureRecovery-Timer is running or not configured, the UE may perform a CFRA procedure for BFR (action 618). In one implementation, a qualified candidate beam may refer to a candidate beam with its RSRP value larger than a threshold. The UE may (implicitly) inform the NW of the qualified candidate beam by transmitting an MSG1 on the associated CFRA resource. Then, the NW may switch the beam for the UE based on the information provided by the UE. If the UE receives an indication of a beam switch (e.g., an indication of TCI state for a UE-specific PDCCH) from the NW, the UE may consider that the beam failure (event) has been recovered. However, if the UE performs a CBRA procedure (e.g., a 2-step CBRA procedure performed in action 616 or a 4-step CBRA procedure performed in action 620), the UE may not inform the NW of the candidate beam information. In this situation, performing a CFRA procedure for BFR may be more useful for BFR than performing a CBRA procedure (e.g., the 2-step CBRA procedure or the 4-step CBRA procedure). In light of this, in one implementation, when a beam failure (event) is detected (e.g., on an SpCell), the UE may determine whether to perform a CFRA procedure first. If certain criteria are not satisfied (e.g., the beamFailureRecoveryTimer is not running, the CFRA resource for BFR is not explicitly provided by RRC, and/or there is no qualified beam in a specific list (e.g., candidate-BeamRSList)), the UE may then determine whether to perform a CBRA procedure (e.g., a 2-step CBRA procedure or a 4-step CBRA procedure). For example, the priority of RA type selection for BFR from high to low may be CFRA (e.g., with 4-step RA type) first, then 2-step CBRA, and then 4-step CBRA.

Figure 7:
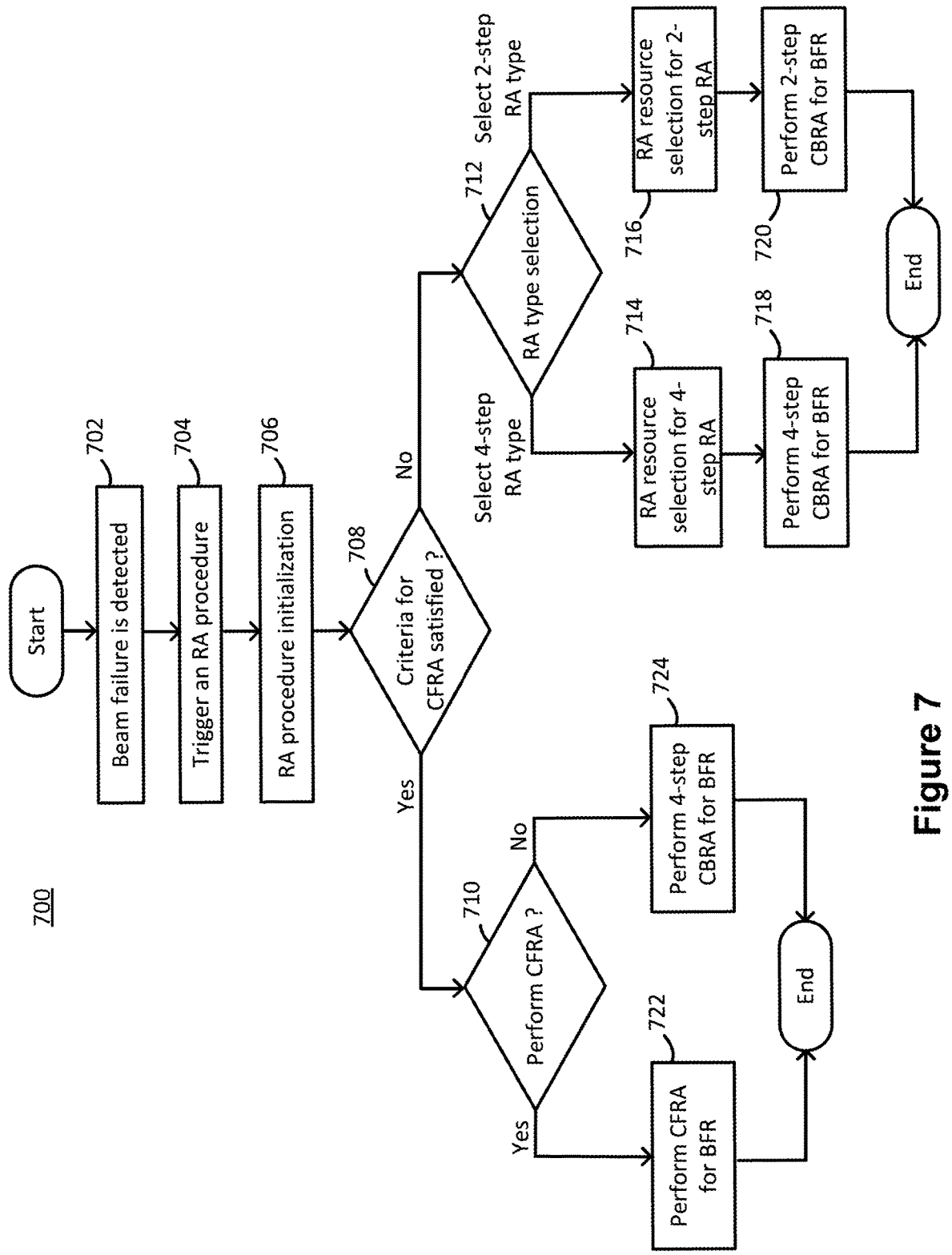
FIG. 7 illustrates a flowchart of an RA procedure for BFR according to an implementation of the present disclosure.

FIG. 7 illustrates a flowchart of an RA procedure 700 for BFR according to an implementation of the present disclosure. As illustrated in FIG. 7, the UE may determine whether to perform a CFRA procedure for BFR during the RA procedure initialization. The UE may determine whether to perform a CFRA procedure for BFR before performing an RA type selection. If the UE decides not to perform the CFRA procedure for BFR, the UE may then perform the RA type selection. Since the UE does not choose to perform a CFRA procedure for BFR, the UE can only perform a 4-step CBRA (i.e., not CFRA) if the UE does not decide to perform a 2-step RA procedure. If the UE decides to perform a 2-step RA procedure, the UE can only perform a 2-step CBRA (i.e., not CFRA) procedure for BFR.

As illustrated in FIG. 7, in action 702, a UE may detect a beam failure (event) (e.g., on an SpCell) by performing a beam failure detection procedure. The lower layer of the UE (e.g., PHY layer) may assess the radio link quality according to the RS for beam failure detection (e.g., a set of RS(s) configured in the failureDetectionResource IE). The lower layer of the UE may provide a beam failure instance indication to the higher layer (e.g., MAC layer) when the radio link quality is lower than a threshold during a certain period. The higher layer of the UE may receive the beam failure instance indication from the lower layer. A beam failure (event) may be considered detected if the number of (consecutive) detected beam failure instances exceeds a configured maximum number, e.g., beamfailureInstanceMaxCount. When a beam failure (event) is detected, the UE may trigger an RA procedure for BFR (action 704), and then perform an RA procedure initialization (action 706). In one implementation, the UE may flush the MSG3/MSGA buffer during the RA procedure initialization. In addition, the UE may reset one or more timers and/or counters for the RA procedure, and/or select an NUL/SUL carrier for performing the RA procedure.

In action 708, the UE may determine whether the criteria for performing a CFRA procedure for BFR are satisfied. For example, the criteria may include:

the RA procedure was initiated for (SpCell) BFR; and
the CFRA resources for BFR request (associated with any of the SSBs and/or CSI-RSs) for a 4-step RA type have been explicitly provided by RRC (for the BWP selected for the RA procedure)

In one implementation, the UE may perform action 708 during the RA procedure initialization. For example, action 708 may be performed after the UE selects an NUL/SUL carrier for performing the RA procedure. For example, action 708 may be performed before the RA type selection.

If the outcome of action 708 is Yes (e.g., all of the criteria are satisfied), the UE may perform action 710, in which the UE may further determine whether to perform a CFRA procedure with a 4-step RA type for BFR based on certain criteria. For example, the UE may decide to perform the CFRA procedure when the following criteria are satisfied:

the RA procedure was initiated for (SpCell) BFR;
the beamFailureRecoveryTimer is running or not configured;
the CFRA resources for BFR request (associated with any of the SSBs and/or CSI-RSs) have been explicitly provided by RRC; and
at least one of the SSBs with the corresponding SS-RSRP value larger than a threshold, rsrp-ThresholdSSB, amongst the SSBs in the candidateBeamRSList is available, or at least one of the CSI-RSs with the corresponding CSI-RSRP value larger than a threshold, rsrp-ThresholdCSI-RS, amongst the CSI-RSs in the candidateBeamRSList is available.

As illustrated in FIG. 7, if the outcome of action 710 is Yes, the UE may perform a CFRA procedure with a 4-step RA type for BFR in action 722. If the outcome of action 710 is No, the UE may perform 4-step CBRA for BFR (e.g., a CBRA procedure with a 4-step RA type) in action 724.

In action 712, the UE may perform an RA type selection. For example, the UE may select the 2-step RA as the outcome of the RA type selection when at least one of the following criteria is satisfied:
the BWP selected for the RA procedure is configured with the 2-step RA resources; and
the RSRP value of the DL pathloss reference is larger than a specific threshold, e.g., rsrp-ThresholdSSB-2stepRA.

If the UE selects the 2-step RA type as the RA type of the RA procedure for BFR, the UE may perform an RA resource selection for 2-step RA (action 716), and only can perform a 2-step CBRA procedure for BFR (action 720). That is, the UE cannot perform a 2-step CFRA procedure for BFR in this situation.

If the UE selects the 4-step RA type as the RA type of the RA procedure for BFR, the UE may perform an RA resource selection for 4-step RA (action 714) and perform a 4-step CBRA procedure for BFR (action 718). In this situation, the UE may not perform a CFRA procedure for BFR.

In action 714, the UE may perform the RA resource selection. For example, the UE may perform a CBRA preamble selection. The UE may select an SSB (e.g., with an SS-RSRP value larger than the rsrp-ThresholdSSB). The UE may select an RA preamble group. The UE may select an RA preamble randomly with equal probability from the RA preambles associated with the selected SSB and the selected RA preamble group. The UE may determine the next available PRACH occasion from the PRACH occasions corresponding to the selected SSB. The UE may perform the 4-step CBRA procedure for BFR (action 718) by transmitting RA preamble(s) via the selected RA resource.

In action 716, the UE may perform an RA resource selection for the 2-step RA. For example, the UE may select an SSB (e.g., with an SS-RSRP value larger than the rsrp-ThresholdSSB). In addition, the UE may select an RA preamble group. The UE may select an RA preamble randomly with equal probability from the 2-step RA preambles associated with the selected SSB. The UE may determine the next available PRACH occasion from the PRACH occasions corresponding to the selected SSB. The UE may determine the UL grant for the PUSCH resource of the MSGA associated with the selected preamble and PRACH occasion. The UE may perform the 2-step CBRA procedure for BFR (action 720) by performing MSGA transmission(s).

Figure 8A:
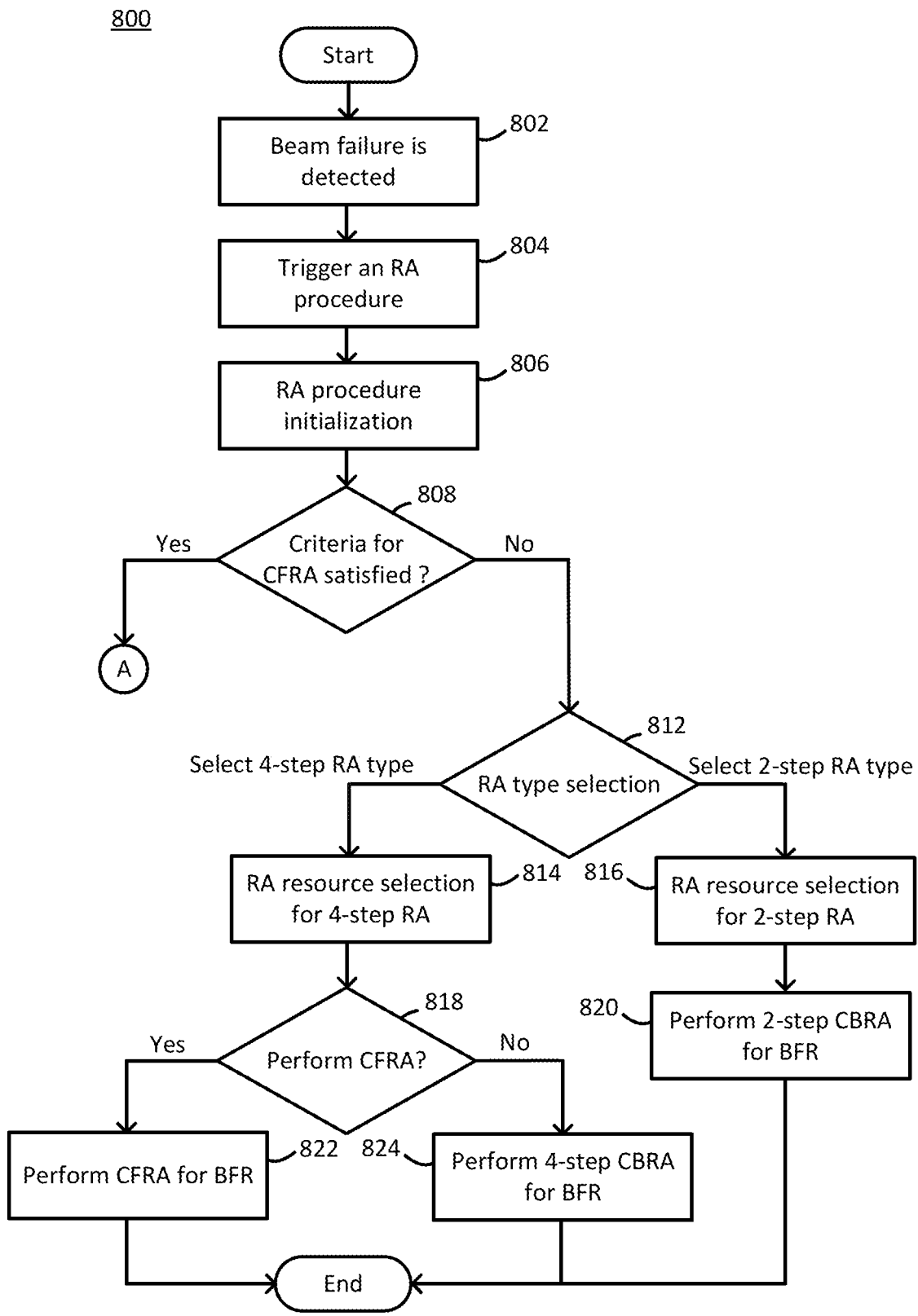
FIG. 8A illustrates a flowchart of an RA procedure for BFR according to an implementation of the present disclosure.

FIG. 8A illustrates a flowchart 800 of an RA procedure for BFR according to an implementation of the present disclosure. In FIG. 8A, the UE may determine whether to perform a CFRA procedure for BFR before performing an RA type selection (e.g., in the RA procedure initialization). However, if the UE does not select the 2-step RA as an outcome of the RA type selection, the UE may still need to determine whether the CFRA procedure for BFR should be performed or not (e.g., in an RA resource selection). In view of this, the UE may need to determine whether to perform a CFRA procedure during the RA procedure initialization and the RA resource selection.

As illustrated in FIG. 8A, in action 802, a UE may detect a beam failure (event) by performing a beam failure detection procedure. The lower layer of the UE (e.g., PHY layer) may assess the radio link quality according to the RS for beam failure detection (e.g., a set of RS(s) configured in the failureDetectionResource IE). The lower layer of the UE may provide a beam failure instance indication to the higher layer (e.g., MAC layer) when the radio link quality is lower than a threshold during a certain period. The higher layer of the UE may receive the beam failure instance indication from the lower layer. A beam failure (event) may be considered detected if the number of (consecutive) detected beam failure instances exceeds a configured maximum number, e.g., beamfailureInstanceMaxCount. When a beam failure (event) is detected, the UE may trigger an RA procedure (action 804) and start an RA procedure initialization (action 806). In one implementation, the UE may flush an MSG3/MSGA buffer during the RA procedure initialization. In addition, the UE may reset one or more timers and/or counters for the RA procedure, and/or select an NUL/SUL carrier for performing the RA procedure.

In action 808, the UE may determine whether the criteria for performing a CFRA procedure for BFR are satisfied. For example, the criteria may include:
the RA procedure was initiated for (SpCell) BFR;
the CFRA resources for BFR request (associated with any of the SSBs and/or CSI-RSs) for a 4-step RA type have been explicitly provided by RRC (for the BWP selected for the RA procedure)

In one implementation, the UE may perform action 808 during the RA procedure initialization. For example, action 808 may be performed after the UE selects an NUL/SUL carrier for performing the RA procedure. In one implementation, action 808 may be performed before the RA type selection.

Figure 8B:
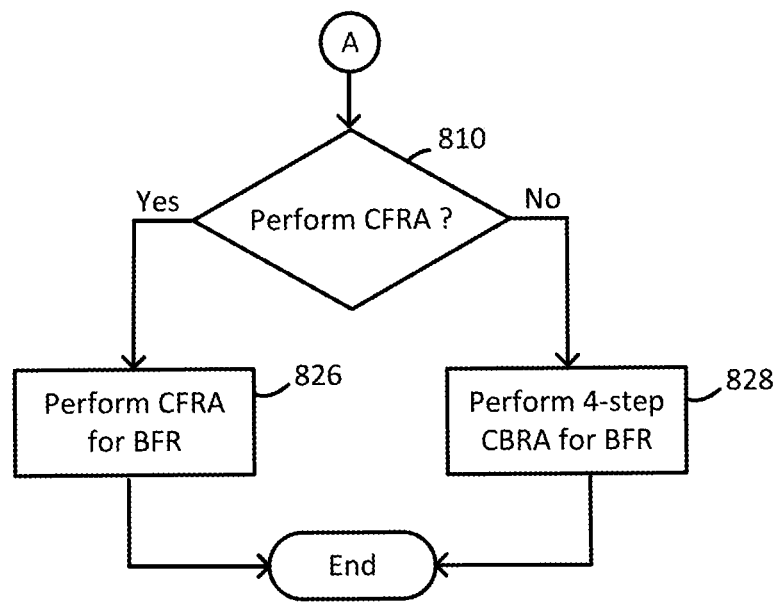
FIG. 8B illustrates a flowchart for a procedure starting with the node A illustrated in FIG. 8A.

If the outcome of action 808 is Yes (e.g., all of the criteria are satisfied), the flowchart may proceed to node A, which is followed by action 810 illustrated in FIG. 8B.

FIG. 8B illustrates a flowchart for a procedure starting with the node A illustrated in FIG. 8A. The procedure includes actions 810, 826 and 828.

In action 810, the UE may determine whether to perform a CFRA procedure with a 4-step RA type for BFR based on certain criteria. In one implementation, the criteria may include:
the RA procedure was initiated for (SpCell) BFR;
the beamFailureRecoveryTimer is running or not configured;
the CFRA resources for BFR request (associated with any of the SSBs and/or CSI-RSs) have been explicitly provided by RRC; and
at least one of the SSBs with the corresponding SS-RSRP value larger than a threshold, rsrp-ThresholdSSB, amongst the SSBs in the candidateBeamRSList is available, or at least one of the CSI-RSs with the corresponding CSI-RSRP value larger than a threshold, rsrp-ThresholdCSI-RS, amongst the CSI-RSs in the candidateBeamRSList is available.

If all of the criteria listed above are satisfied, the UE may perform a CFRA procedure with a 4-step RA type for BFR in action 826. Conversely, if one or more of the criteria listed above are not satisfied, the UE may perform a CBRA procedure with a 4-step RA type in action 828.

Tuning to FIG. 8A, in action 812, the UE may perform an RA type selection if the criteria for performing a CFRA procedure is determined as not satisfied in action 808. For example, the UE may select the 2-step RA (type) as the RA type of the RA procedure when at least one of the following criteria is satisfied:

the BWP selected for the RA procedure is configured with the 2-step RA resources; and the RSRP value of the DL pathloss reference is larger than a specific threshold, e.g., rsrp-ThresholdSSB-2stepRA.

If the UE selects the 2-step RA type as the RA type of the RA procedure for BFR, the UE may perform an RA resource selection for a 2-step RA procedure (action 816).

If the UE selects the 4-step RA type as the RA type of the RA procedure for BFR, actions 814, 818, and 822/824 may be performed.

In action 818, the UE may determine whether to perform a CFRA procedure (with 4-step RA type) for BFR. For example, the UE may perform a CFRA procedure (with 4-step RA type) for BFR when all the following criteria are satisfied:

the RA procedure was initiated for (SpCell) BFR;

the beamFailureRecoveryTimer is running or not configured;

the CFRA resources for BFR request (associated with any of the SSBs and/or CSI-RSs) have been explicitly provided by RRC; and at least one of the SSBs with the SS-RSRP value larger than the rsrp-ThresholdSSB amongst the SSBs in the candidateBeamRSList is available, or at least one of the CSI-RSs with the CSI-RSRP value larger than the rsrp-ThresholdCSI-RS amongst the CSI-RSs in the candidateBeamRSList is available.

If the UE decides to perform the CFRA procedure (with 4-step RA type) for BFR, action 822 may be performed. If the UE decides not to perform the CFRA procedure (with 4-step RA type) for BFR, the UE may perform a 4-step CBRA procedure for BFR (action 824).

In action 822, the CFRA procedure (with 4-step RA type) for BFR is performed. For example, the UE may select an SSB with the SS-RSRP value larger than the rsrp-ThresholdSSB amongst the SSBs in the candidateBeamRSList or a CSI-RS with the CSI-RSRP value larger than the rsrp-ThresholdCSI-RS amongst the CSI-RSs in the candidateBeamRSList. The UE may determine the next available PRACH occasion from the PRACH occasions corresponding to the selected SSB/CSI-RS. The UE may select an RA preamble corresponding to the selected SSB/CSI-RS. The UE may perform the RA preamble transmission(s).

In action 824, the UE may perform a 4-step CBRA procedure for BFR. For example, during the 4-step CBRA procedure for BFR, the UE may perform a CBRA preamble selection. The UE may select an SSB (e.g., with the SS-RSRP value larger than the rsrp-ThresholdSSB). The UE may select an RA preamble group. The UE may select an RA preamble randomly with equal probability from the RA preambles associated with the selected SSB and the selected RA preamble group. The UE may determine the next available PRACH occasion from the PRACH occasions corresponding to the selected SSB. The UE may perform the RA preamble transmission(s).

In action 816, the UE may perform an RA resource selection for a 2-step RA procedure. In action 820, the UE may perform a 2-step CBRA procedure for BFR using the selected RA resource. For example, the UE may select an SSB (e.g., with the SS-RSRP value larger than the rsrp-ThresholdSSB). The UE may select an RA preamble group. The UE may select an RA preamble randomly with equal probability from the 2-step RA preambles associated with the selected SSB. The UE may determine the next available PRACH occasion from the PRACH occasions corresponding to the selected SSB. The UE may determine the UL grant for the PUSCH resource of the MSGA associated with the selected preamble and PRACH occasion. The UE may perform the MSGA transmission(s).

In one implementation, a timer, e.g., beamFailureRecoveryTimer (specified in 3GPP TS 38.331 V15.6.0) in a BFR configuration may be used to control the time the UE is able to use CFRA for BFR during the RA procedure for BFR. Upon expiry of the timer, the UE does not use the CFRA for BFR, and the UE may fallback to a 4-step CBRA procedure for BFR. However, since the 2-step CBRA procedure is further introduced to support BFR, the timer may also be used to control the time at which the UE is allowed to fall back to the 2-step CBRA procedure for BFR. For example, during the RA resource selection for the 2-step RA procedure, the UE may determine whether to perform a 2-step CBRA procedure for BFR based on whether the timer is running or not. The UE may perform 2-step CBRA for BFR if the timer is not running. The UE may switch to perform a CFRA procedure for BFR if the timer is running and the UE selects the 2-step RA type as the RA type of the RA procedure. In one implementation, the UE may not select the 2-step CBRA procedure for BFR to perform if the timer is running.

In one implementation, if the UE decides to perform a CFRA procedure for BFR during an RA procedure, but the timer expires (or other criteria for the UE to perform the CFRA procedure for BFR is not satisfied), the UE may only fallback to perform the 4-step CBRA procedure for BFR during the RA procedure. In other words, the UE may not fall back to a 2-step CBRA procedure for BFR during the RA procedure.

In one implementation, if one attempt to perform a 4-step RA procedure for BFR fails, the UE may (only) try to perform the 4-step RA procedure for BFR again. In other words, the UE may not try another RA type (e.g., 2-step RA type) for the RA procedure.

In one implementation, if the UE decides to perform a CFRA procedure with 4-step RA type for BFR during an RA procedure, but the timer expires (or other criteria for the UE to perform the CFRA procedure with 4-step RA type for BFR is not satisfied), the UE may still be able to select another RA type to perform (e.g., a 2-step CBRA procedure for BFR). In other words, the UE may switch the RA type after the UE decides to perform a CFRA procedure with a 4-step RA type for BFR. For example, the UE may fallback to perform a 2-step (CB)RA procedure for BFR if the criterion of performing a 2-step RA procedure is satisfied during the RA procedure. The UE may fallback to a 4-step CBRA procedure for BFR if the criterion of performing a 2-step RA procedure is not satisfied during the RA procedure.

In one implementation, if the UE attempts to fallback to other RA types, the UE may need to initiate a new RA procedure and terminate the ongoing RA procedure.

In one implementation, if the UE decides to perform an RA procedure based on a 2-step CBRA procedure for BFR during an RA procedure. The UE may not switch to a CFRA procedure for BFR during the RA procedure (e.g., even if the timer is running).

In one implementation, if the UE decides to perform an RA procedure based on a 2-step CBRA procedure for BFR during an RA procedure, the UE may still have a chance to switch to a CFRA procedure for BFR during the RA procedure. In other words, the UE is allowed to switch the RA type during the same RA procedure.

In one implementation, if the UE attempts to fallback to perform different RA types, the UE may need to initiate a new RA procedure and terminate the ongoing RA procedure.

Figure 9:
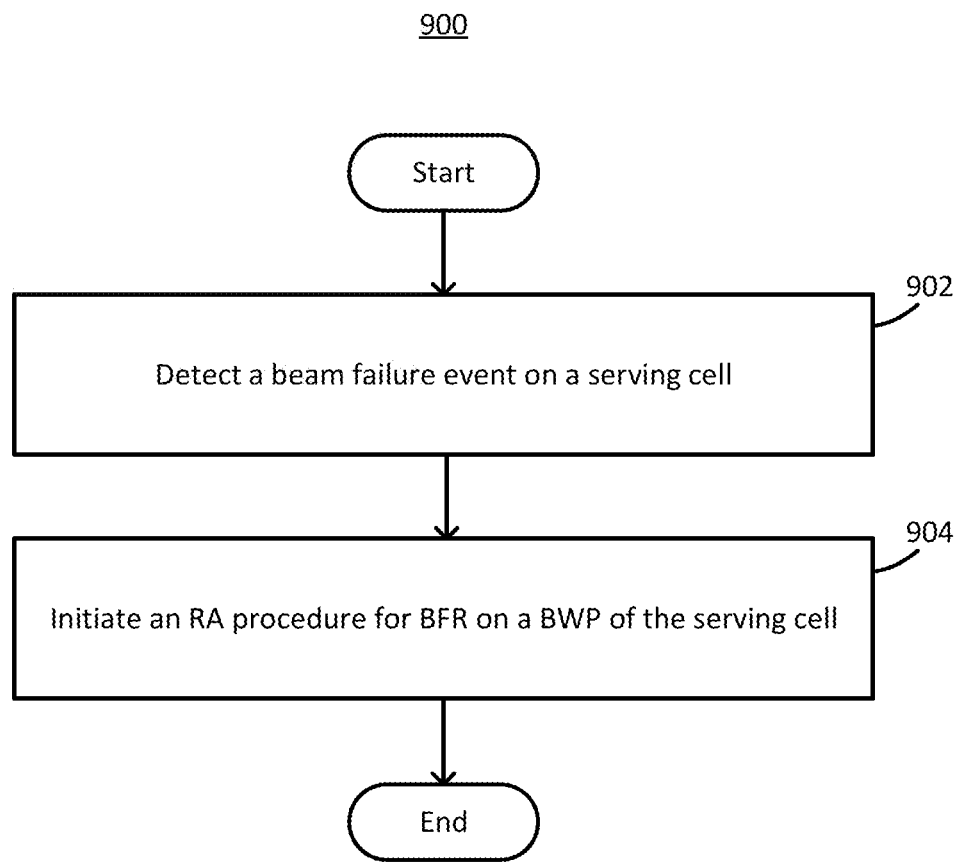
FIG. 9 illustrates a flowchart for a method performed by a UE for (SpCell) BFR, according to an implementation of the present disclosure.

FIG. 9 illustrates a flowchart for a method 900 performed by a UE for (SpCell) BFR, according to an implementation of the present disclosure.

In action 902, the UE may detect a beam failure event on a serving cell.

In one implementation, the serving cell may be an SpCell.

In action 904, the UE may initiate an RA procedure for BFR on a BWP of the serving cell.

Figure 10:
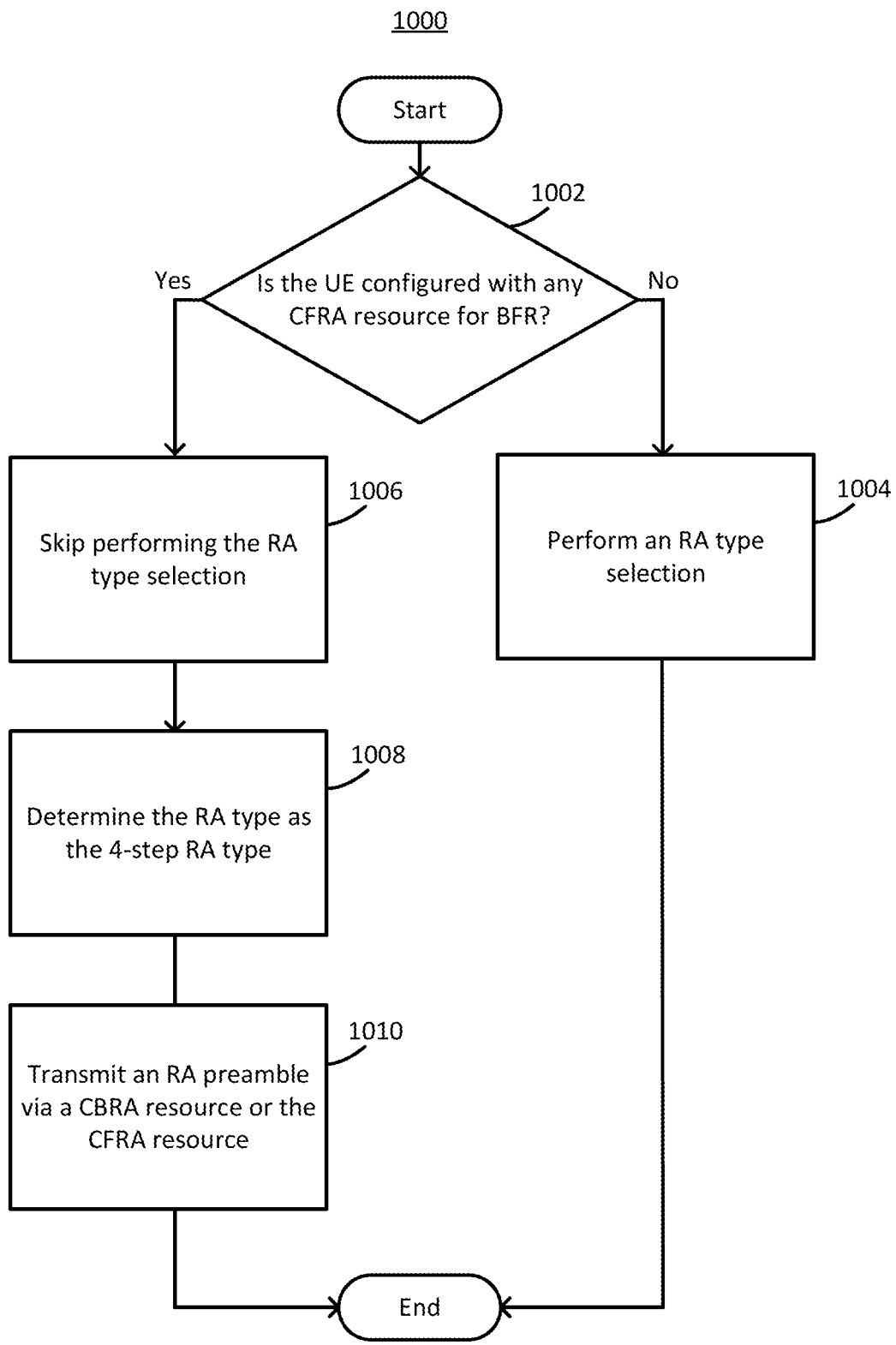
FIG. 10 illustrates an example of a flowchart of an RA procedure for BFR, according to an implementation of the present disclosure.

FIG. 10 illustrates an example of a flowchart 1000 of an RA procedure for BFR, according to an implementation of the present disclosure. It should be noted that although actions 1002, 1004, 1006, 1008, 1010 and 1012 are illustrated as separate actions represented as independent blocks in FIG. 10, these separately delineated actions should not be construed as necessarily order dependent. The order in which the actions are performed in FIG. 10 is not intended to be construed as a limitation, and any number of the disclosed blocks may be combined in any order to implement the method, or an alternate method. Moreover, one or more of the actions 1002, 1004, 1006, 1008, 1010 may be omitted in some of the present implementations.

In action 1002, the UE may determine whether it is configured with any CFRA resource for BFR.

In action 1004, the UE may perform an RA type selection after determining that the UE is not configured with any CFRA resource for BFR. In one implementation, the RA type selection may include determining a 2-step RA type or a 4-step RA type as an RA type of the RA procedure for BFR based on an RSRP value of a DL pathloss reference.

In one implementation, the RA type selection may be performed in an initialization phase of the RA procedure for BFR (or "RA procedure initialization").

In one implementation, the UE may select a carrier before performing the RA type selection. The carrier may be an NUL or an SUL.

In one implementation, in a case that the UE is not configured with any CFRA resource for BFR, the UE may transmit an RA preamble via a CBRA resource after performing the RA type selection.

In action 1006, the UE may skip performing an RA type selection after determining that the UE is configured with a CFRA resource for BFR.

In one implementation, the CFRA resource for BFR may be a 4-step RA type RA resource.

In action 1008, the UE may determine/set the RA type of the RA procedure as the 4-step RA type after skipping performing the RA type selection. In other words, if there are one or more CFRA resources for BFR allocated to the UE, the UE may not perform RA type selection to determine the RA type of the RA procedure. Instead, the UE may directly consider/set the 4-step RA type as the RA type of the RA procedure by default. In one implementation, the UE is not allowed to select the 2-step RA type as the RA type of the RA procedure in a case that the UE skips performing the RA type selection.

In action 1010, in a case that the UE is configured with a CFRA resource for BFR, the UE may transmit an RA preamble via a CBRA resource or the CFRA resource after skipping performing the RA type selection and after determining the RA type as the 4-step RA type.

Figure 11:
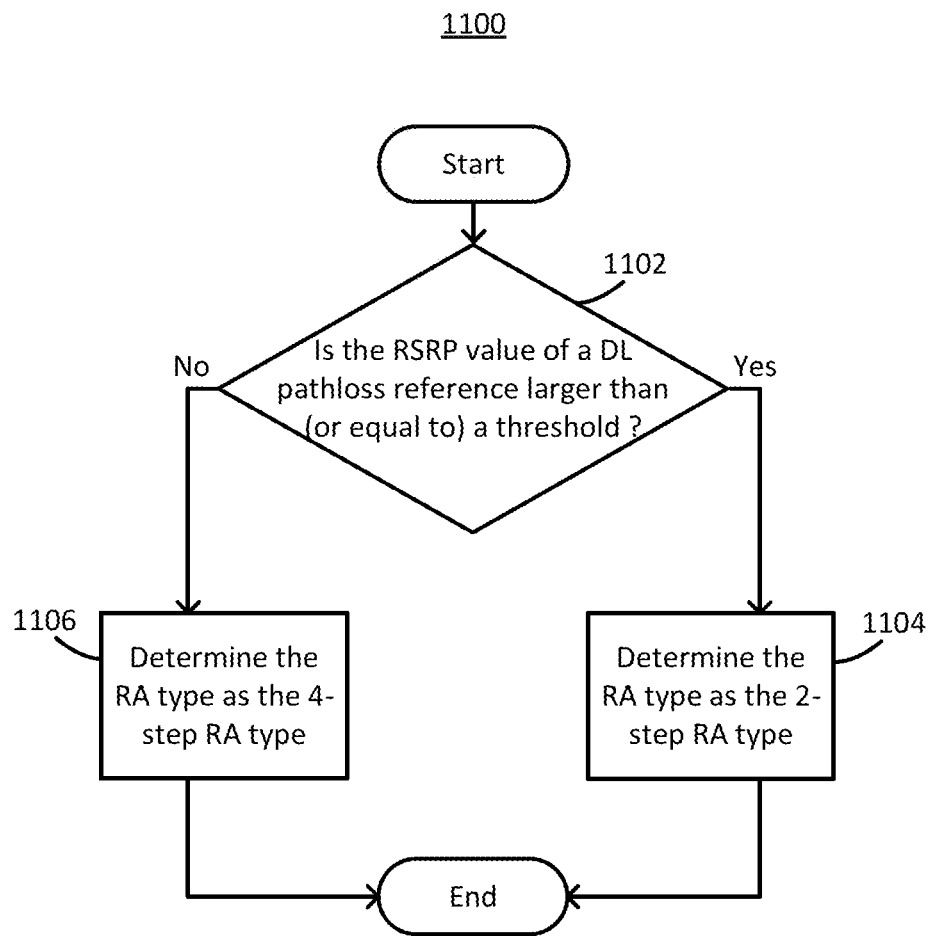
FIG. 11 illustrates an example of a flowchart for the RA type selection described in FIG. 10.

FIG. 11 illustrates an example of a flowchart 1100 for the RA type selection disclosed in FIG. 10.

As illustrated in FIG. 11, in action 1102, the UE may determine whether the RSRP value of a DL pathloss reference larger than (or equal to) a threshold. In one implementation, the threshold may be configured by a 2-step RA configuration.

In action 1104, if the RSRP value of the DL pathloss reference is larger than (or equal to) the threshold, the UE may determine the RA type of the RA procedure as the 2-step RA type.

In action 1106, if the RSRP value of the DL pathloss reference is less than the threshold, the UE may determine the RA type of the RA procedure as the 4-step RA type.

In one implementation, the UE may determine the RA type as the 2-step RA type in the RA type selection if the BWP (on which the RA procedure is initiated) is not configured with any 4-step RA type RA resource and is configured with at least one 2-step RA type RA resource.

The technology disclosed herein thus encompasses, but is not limited to, the following example embodiments and modes:

Example 1

A method of a UE comprising:
Receiving an RRC configuration from an NW node;
Detecting a beam failure based on measuring an RS; and
Initiating an RA procedure for BFR when the beam failure is detected.

Example 2

Based on Example 1, the UE further comprising:
Determining whether to perform CFRA for BFR based on a criterion;
Performing CFRA for BFR if the criterion is satisfied; and
Selecting an RA type based on a rule if the criterion is not satisfied.

Example 3

Based on any of Examples 1-2, the UE further comprising:
Selecting an RA type based on a rule; and
Performing RA resource selection for 2-step RA if the rule is satisfied and determining whether to perform CFRA for BFR based on a criterion during the RA selection for 2-step RA; Performing RA resource selection if the rule is not satisfied and determining whether to perform CFRA for BFR based on a criterion during the RA selection.

Example 4

Based on any of Examples 1-3, wherein the RRC configuration includes a first configuration for RA.

Example 5

Based on any of Examples 1-4, wherein the first configuration is RACH-ConfigCommon, RACH-ConfigDedicated, and/or RACH-ConfigGeneric (e.g., as specified in 3GPP TS 38.331 V15.6.0).

Example 6

Based on any of Examples 1-5, wherein the RRC configuration includes a second configuration for 2-step RA.

Example 7

Based on any of Examples 1-6, wherein the RRC configuration includes a third configuration for BFR.

Example 8

Based on any of Examples 1-7, wherein the third configuration is BeamFailureRecoveryConfig (e.g., as specified in 3GPP TS 38.331 V15.6.0).

Example 9

Based on any of Examples 1-8, wherein the RA procedure is to perform CFRA, CBRA, and/or 2-step RA.

Example 10

Based on any of Examples 1-9, wherein the RS is configured in RadioLinkMonitoringConfig (e.g., as specified in 3GPP TS 38.331 V15.6.0).

Example 11

Based on any of Examples 1-10, wherein the RS is a list of RSs for detecting beam failure.

Example 12

Based on any of Examples 1-11, wherein the beam failure is detected when the number of beam failure instance indications from the physical layer reaches a configured threshold before a configured timer expires.

Example 13

Based on any of Examples 1-12, wherein the beam failure is detected on SpCell.

Example 14

Based on any of Examples 1-13, wherein the criterion is to determine if the RA procedure was initiated for BFR.

Example 15

Based on any of Examples 1-14, wherein the criterion is to determine if the beamFailureRecoveryTimer (e.g., as specified in 3GPP TS 38.331 V15.6.0) is either running or not configured.

Example 16

Based on any of Examples 1-15, wherein the criterion is to determine if the CFRA Resources for BFR request associated with any of the SSBs and/or CSI-RSs have been explicitly provided by the NW node.

Example 17

Based on any of Examples 1-16, wherein the criterion is to determine if at least one of the SSBs with SS-RSRP above rsrp-ThresholdSSB amongst the SSBs in candidate-BeamRSList or the CSI-RSs with CSI-RSRP above rsrp-ThresholdCSI-RS amongst the CSI-RSs in candidate-BeamRSList is available.

Example 18

Based on any of Examples 1-17, wherein the rule is to determine if a BWP selected for the RA procedure is configured with 2-step RA resources.

Example 19

Based on any of Examples 1-18, wherein the rule is to determine if the RSRP of the downlink pathloss reference is above rsrp-ThresholdSSB-2stepRA.

Example 20

Based on any of Examples 1-19, wherein the UE selects a 2-step RA procedure if the rule is satisfied.

Example 21

Based on any of Examples 1-20, wherein the UE selects the RA procedure of release 15 (e.g., as specified in 3GPP TS 38.321 V15.6.0) if the rule is not satisfied.

Example 22

Based on any of Examples 1-21, wherein the NW node is a TRP, cell, or gMB.

Example 23

Based on any of Examples 1-22, wherein the cell is a PCell, PSCell, SpCell, or SCell.

Example 24

A UE comprising:
a control circuit;
a processor installed in the control circuit;
a memory installed in the control circuit and coupled to the processor;
wherein the processor is configured to execute a program code stored in the memory to perform the method steps as defined in any one of Examples 1-23.

The following descriptions may be used to further elaborate the term, example, embodiment, action, behavior, alternative, aspect, example, or claim mentioned above:

User Equipment (UE): The UE may refer to a PHY/MAC/RLC/PDCP/SDAP entity. The PHY/MAC/RLC/PDCP/SDAP entity may be referred to the UE.

NW: The NW may be an NW node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation the term Special Cell refers to the PCell of the MCG or the PSCell of the SCG depending on if the MAC entity is associated with the MCG or the SCG, respectively. Otherwise, the term Special Cell refers to the PCell. A Special Cell supports PUCCH transmission and CBRA, and is always activated.

CC (Component Carrier): The CC may be PCell, PSCell, and/or SCell.

BFR procedure: The BFR procedure may be a SpCell BFR procedure and/or a SCell BFR procedure.

SpCell BFR procedure: The SpCell BFR procedure may be performed based on the CFRA procedure and/or contention-based RA procedure. The SpCell BFR procedure is initiated when the corresponding RA procedure is initiated. The SpCell BFR procedure is ongoing when the corresponding RA procedure is ongoing. The SpCell BFR procedure is stopped when the corresponding RA procedure is stopped. The SpCell BFR procedure is completed when the corresponding RA procedure is completed.

SCell BFR procedure: The SCell BFR procedure may be performed based on BFR-SR. The SCellBFR procedure may be initiated when the corresponding BFR-SR is triggered. The SCell BFR procedure may be ongoing when the corresponding BFR-SR is pending. The SCell BFR procedure may be stopped when the corresponding BFR-SR is canceled.

Beam: The term "beam" may be replaced by a spatial filter. For example, when UE reports a preferred gNB TX beam, UE is essentially selecting a spatial filter used by gNB. The term "beam information" is used to provide information about which beam/spatial filter is being used/selected. In one example, individual RSs are transmitted by applying individual beams (spatial filters). Thus, the beam or the beam information may be represented by an RS resource index(es). The beam may be DL and/or UL beam. The beam may be a Tx beam and/or Rx beam. The beam may be a UE beam and/or NW beam. The beam may refer to an RS (e.g., SSB, CSI-RS, and/or SRS), and/or TCI state. The (new) beam may be indicated via an RS (e.g., SSB, CSI-RS, and/or SRS), and/or TCI state.

For the NW side, an NW may have multiple TRPs (either centralized or distributed). Each TRP can form multiple beams for transmission or reception. The number of beams and the number of simultaneous beams in the time/frequency domain may depend on the number of antenna array elements and the Radio Frequency (RF) at the TRP. The TRP may apply beamforming to both data and control signaling transmission or reception. The number of beams generated concurrently by TRP depends on TRP capability, e.g., the maximum number of beams generated concurrently by different TRPs in the same cell may be the same, and those in different cells may be different. Beam sweeping may be necessary, e.g., for the control signaling to be provided in every direction.

For the UE side, a UE may perform beamforming for transmission or reception. A UE may be possible to generate multiple UE beams concurrently and to be served by multiple serving beams from one or multiple TRPs of the same cell. Same or different (DL or UL) data could be transmitted on the same radio resource via different beams for diversity or throughput gain.

Figure 12:
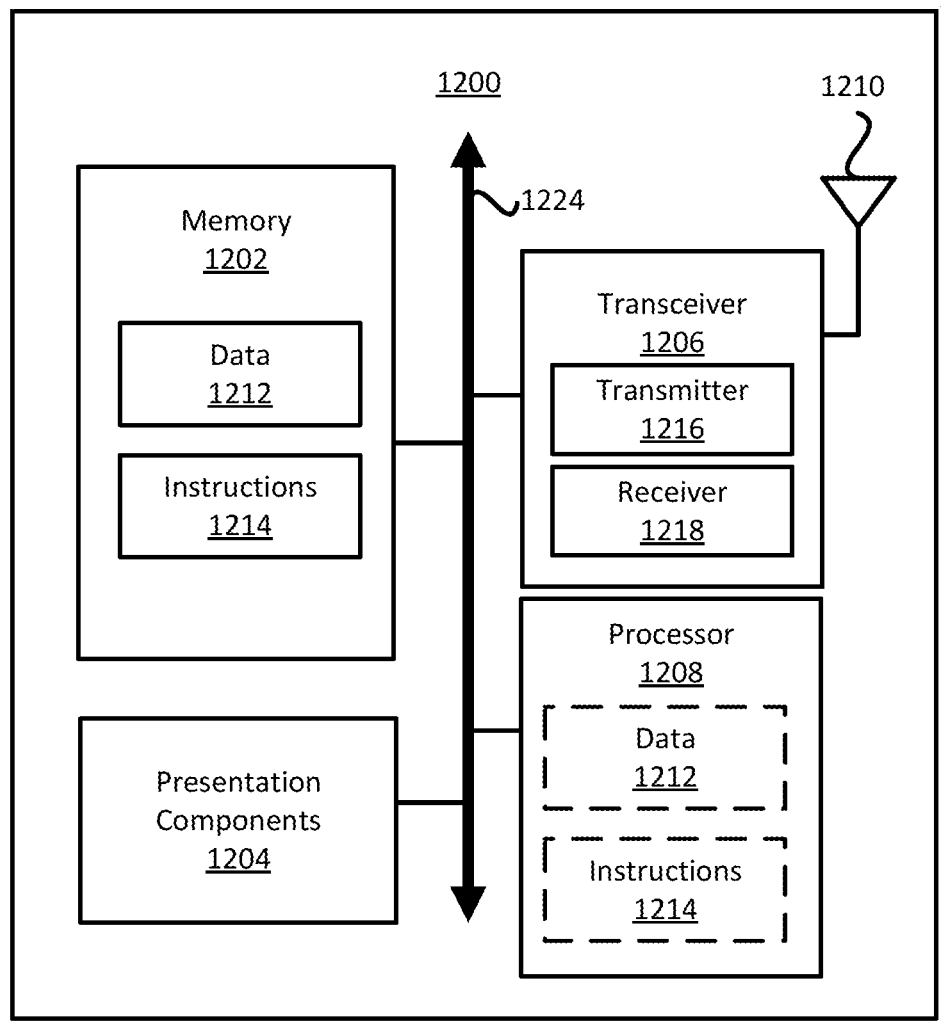
FIG. 12 illustrates a block diagram of a node for wireless communication, in accordance with various aspects of the present disclosure.

FIG. 12 illustrates a block diagram of a node for wireless communication, in accordance with various aspects of the present disclosure. As illustrated in FIG. 12, the node 1200 may include a transceiver 1206, a processor 1208, a memory 1202, one or more presentation components 1204, and at least one antenna 1210. The node 1200 may also include an RF spectrum band module, a BS communications module, an NW communications module, and a system communications management module, Input/Output (I/O) ports, I/O components, and a power supply (not explicitly illustrated in FIG. 12). Each of these components may be in communication with each other, directly or indirectly, over one or more buses 1224. In one implementation, the node 1200 may be a UE or a BS that performs various functions described herein, for example, with reference to FIGS. 1 through 11.

The transceiver 1206 having a transmitter 1216 (e.g., transmitting/transmission circuitry) and a receiver 1218 (e.g., receiving/reception circuitry) may be configured to transmit and/or receive time and/or frequency resource partitioning information. In one implementation, the transceiver 1206 may be configured to transmit in different types of subframes and slots, including, but not limited to, usable, non-usable and flexibly usable subframes and slot formats. The transceiver 1206 may be configured to receive data and control channels.

The node 1200 may include a variety of computer-readable media. Computer-readable media can be any available media that can be accessed by the node 1200 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired NW or direct-wired connection, and wireless media such as acoustic, RF, infrared, and other wireless media. Combinations of any of the above should also be included within the scope of computer-readable media.

The memory 1202 may include computer storage media in the form of volatile and/or non-volatile memory. The memory 1202 may be removable, non-removable, or a combination thereof. For example, the memory 1202 may include solid-state memory, hard drives, optical-disc drives, etc. As illustrated in FIG. 12, the memory 1202 may store computer-readable and/or computer-executable instructions 1214 (e.g., software codes) that are configured to, when executed, cause the processor 1208 to perform various functions described herein, for example, with reference to FIGS. 1 through 11. Alternatively, the instructions 1214 may not be directly executable by the processor 1208 but may be configured to cause the node 1200 (e.g., when compiled and executed) to perform various functions described herein.

The processor 1208 (e.g., having processing circuitry) may include an intelligent hardware device, a Central Processing Unit (CPU), a microcontroller, an ASIC, etc. The processor 1208 may include memory. The processor 1208 may process the data 1212 and the instructions 1214 received from the memory 1202, and information through the transceiver 1206, the baseband communications module, and/or the NW communications module. The processor 1208 may also process information to be sent to the transceiver 1206 for transmission through the antenna 1210, to the NW communications module for transmission to a CN.

One or more presentation components 1204 may present data indications to a person or other devices. Examples of presentation components 1204 may include a display device, speaker, printing component, vibrating component, etc.

From the present disclosure, it is manifested that various techniques may be used for implementing the concepts of the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for Beam Failure Recovery (BFR), the method comprising:
    detecting a beam failure event on a serving cell;
    determining whether the serving cell is a Special Cell (SpCell) or a Secondary Cell (SCell) to initiate a Random Access (RA) procedure for an SpCell BFR procedure or to trigger an SCell BFR procedure;
    triggering the SCell BFR procedure in a case that the serving cell is the SCell; and
    initiating the RA procedure on a Bandwidth Part (BWP) on the serving cell in a case that the serving cell is the SpCell, the RA procedure BFR including:
        performing an RA type selection after determining that the UE is not configured with any Contention-Free RA (CFRA) resource, the RA type selection including determining one of a 2-step RA type and a 4-step RA type as an RA type of the RA procedure based on a Reference Signal Received Power (RSRP) value of a Downlink (DL) pathloss reference;
        determining the RA type as the 2-step RA type in the RA type selection in a case that the RSRP value is larger than a threshold configured by a 2-step RA configuration;
        not performing the RA type selection after determining that the UE is configured with a CFRA resource;
        determining the RA type as the 4-step RA type after not performing the RA type selection in a case that the CFRA resource is a 4-step RA type RA resource; and
        determining that the SpCell BFR procedure is completed when the RA procedure is completed.

2. The method of claim 1, further comprising:
    determining the RA type as the 2-step RA type in the RA type selection in a case that the BWP is not configured with any 4-step RA type RA resource and is configured with at least one 2-step RA type RA resource.

3. The method of claim 1, wherein the UE is not configured with any CFRA resource, and the RA procedure further includes:
    transmitting an RA preamble via a Contention-Based RA (CBRA) resource after performing the RA type selection.

4. The method of claim 1, wherein the UE is configured with the CFRA resource, and the RA procedure further includes:
    transmitting an RA preamble via one of a Contention-Based RA (CBRA) resource and the CFRA resource after not performing the RA type selection.

5. The method of claim 1, wherein the UE is not allowed to select the 2-step RA type as the RA type of the RA procedure in a case that the UE does not perform the RA type selection.

6. The method of claim 1, wherein the RA procedure further includes:
    selecting a carrier before performing the RA type selection, wherein the carrier is a Normal Uplink (NUL) or a Supplementary UL (SUL).

7. The method of claim 1, wherein the RA type selection is performed in an initialization phase of the RA procedure.

8. A User Equipment (UE) for Beam Failure Recovery (BFR), the UE comprising:
    a memory; and
    at least one processor coupled to the memory, the at least one processor being configured to:
    detect a beam failure event on a serving cell;
    determine whether the serving cell is a Special Cell (SpCell) or a Secondary Cell (SCell) to initiate a Random Access (RA) procedure for an SpCell BFR procedure or to trigger an SCell BFR procedure;
    trigger the SCell BFR procedure in a case that the serving cell is the SCell; and
    initiate the RA procedure on a Bandwidth Part (BWP) on the serving cell in a case that the serving cell is the SpCell, the RA procedure including:
        performing an RA type selection after determining that the UE is not configured with any Contention-Free RA (CFRA) resource, the RA type selection including determining one of a 2-step RA type and a 4-step RA type as an RA type of the RA procedure based on a Reference Signal Received Power (RSRP) value of a Downlink (DL) pathloss reference;
        determining the RA type as the 2-step RA type in the RA type selection in a case that the RSRP value is larger than a threshold configured by a 2-step RA configuration;
        not performing the RA type selection after determining that the UE is configured with a CFRA resource;
        determining the RA type as the 4-step RA type after not performing the RA type selection in a case that the CFRA resource is a 4-step RA type RA resource; and
        determine that the SpCell BFR procedure is completed when the RA procedure is completed.

9. The UE of claim 8, wherein the at least one processor is further configured to:
    determine the RA type as the 2-step RA type in the RA type selection in a case that the BWP is not configured with any 4-step RA type RA resource and is configured with at least one 2-step RA type RA resource.

10. The UE of claim 8, wherein the UE is not configured with any CFRA resource, and the at least one processor is further configured to:
    transmit an RA preamble via a Contention-Based RA (CBRA) resource after performing the RA type selection.

11. The UE of claim 8, wherein the UE is configured with the CFRA resource, and the at least one processor is further configured to:
    transmit an RA preamble via one of a Contention-Based RA (CBRA) resource and the CFRA resource after not performing the RA type selection.

12. The UE of claim 8, wherein the UE is not allowed to select the 2-step RA type as the RA type of the RA procedure in a case that the UE does not perform the RA type selection.

13. The UE of claim 8, wherein the at least one processor is further configured to:
- select a carrier before performing the RA type selection, wherein the carrier is a Normal Uplink (NUL) or a Supplementary UL (SUL).

14. The UE of claim 8, wherein the RA type selection is performed in an initialization phase of the RA procedure.

* * * * *